United States Patent [19]

Lindstrom et al.

[11] Patent Number: 4,813,365

[45] Date of Patent: Mar. 21, 1989

[54] DOUBLE DEADRISE WITH MULTIPLE REFLEX CHINE BOAT HULL STRUCTURE AND ENGINE MOUNTING SYSTEM

[76] Inventors: Albert K. Lindstrom, P.O. Box 409, Gardiner, Wash. 98334; David R. Strader, 1820 Eagle Harbor La. NE. #9, Bainbridge Island, Wash. 98110; George S. Henley, 40516 S. Silver Lake Rd. E., Eatonville, Wash. 98328

[21] Appl. No.: 947,706

[22] Filed: Dec. 30, 1986

[51] Int. Cl.$^4$ .............................................. B63H 5/12

[52] U.S. Cl. ........................................ 114/56; 114/352; 248/640

[58] Field of Search ................. 114/56, 288, 291, 290, 114/271, 352; D12/313, 314; 248/640

[56] References Cited

U.S. PATENT DOCUMENTS

| | | | |
|---|---|---|---|
| D. 190,400 | 5/1961 | Tritt | D71/1 |
| D. 191,807 | 11/1961 | Canazzi | D71/1 |
| D. 193,041 | 6/1962 | Leger | D71/1 |
| D. 196,211 | 9/1963 | Rowland | D71/1 |
| D. 205,604 | 8/1966 | Stamas | D71/1 |
| D. 214,765 | 7/1969 | Dougherty | D71/1 |
| D. 221,808 | 9/1971 | Simpkins | D71/1 |
| D. 227,708 | 7/1973 | Baker | D71/1 |
| D. 235,530 | 6/1975 | Livingston | D12/62 |
| D. 236,333 | 8/1975 | Livingston | D12/62 |
| D. 244,769 | 7/1977 | Nescher | D12/62 |
| 2,044,771 | 6/1936 | Carr | 114/66.5 |
| 2,764,119 | 9/1956 | Sigler | 115/17 |
| 2,842,086 | 7/1958 | Yost | 115/0.5 |
| 3,091,206 | 5/1963 | Cale | 114/66.5 |
| 3,117,544 | 1/1964 | Schoell | 114/56 |
| 3,303,809 | 2/1967 | Ross | 114/56 |
| 3,568,617 | 3/1971 | Yost | 114/66.5 |
| 3,709,179 | 1/1973 | Payne | 114/66.5 P |
| 3,776,168 | 12/1973 | Weeks | 114/56 |
| 3,937,164 | 2/1976 | Austin | 114/66.5 |
| 4,128,072 | 12/1978 | Wood, Jr. | 114/291 |
| 4,192,248 | 3/1980 | Moyer | 114/56 |
| 4,193,370 | 3/1980 | Schoell | 114/291 |
| 4,233,920 | 11/1980 | Wood et al. | 114/56 |
| 4,306,703 | 12/1981 | Finze | 248/642 |
| 4,398,483 | 8/1983 | Wood et al. | 114/56 |
| 4,448,387 | 5/1984 | Gilbreath | 248/642 |
| 4,453,489 | 6/1984 | Charlins | 114/288 |
| 4,528,931 | 7/1985 | Lantz | 114/288 |
| 4,584,959 | 4/1986 | Allison | 114/288 |
| 4,672,905 | 6/1987 | Pipkorn | 114/290 |
| 4,708,087 | 11/1987 | Potter, Jr. | 114/362 |

FOREIGN PATENT DOCUMENTS 20719 12/1957 German Democratic Rep. ................................... 114/271

OTHER PUBLICATIONS

"Glas-Ply 1875" brochure.
"Glaspy-How a Boat Should be Built" brochure.
"Glaspy-Scimitar 1801 RNBT I/O" brochure.
"GMI-Impulse" brochure.

Primary Examiner—Joseph F. Peters, Jr.
Assistant Examiner—Ed Swinehart
Attorney, Agent, or Firm—Garrison & Stratton

[57] ABSTRACT

The double deadrise with multiple reflex chine boat hull structure and engine mounting system relate to designs for power boat hull structures and engine mounting systems. The hull structure combines the use of two pairs of bottom surfaces, reflex chines and side panels to form a double deadrise hull structure. This design imparts a highly efficient means for dynamic tracking, thereby, preventing "slide-out". The design also enables the hull structure to quickly and easily achieve a plane. The engine mounting device provides an improved means for securing and supporting an engine to a hull structure. The engine mounting device permits the hull structure to have a high transom, reduces the space in the working compartment that would otherwise be occupied by the engine, engine housing, or engine well, permits the proper positioning of the propeller within the water reservoir to achieve optimum thrust performance, provides static flotation and incorporates all of the benefits achieved in the new hull design. The engine mounting system adds approximately two feet of planning surface to the stern which assists the hull structure to maintain an even keel, better trim, and to quickly and easily climb onto a plane without a pronounced sternward pitch.

26 Claims, 2 Drawing Sheets

DOUBLE DEADRISE WITH MULTIPLE REFLEX CHINE BOAT HULL STRUCTURE AND ENGINE MOUNTING SYSTEM

DESCRIPTION

1. Technical Field

This invention relates to the technical field of designs for power boat hull structures and engine mounting systems.

The structural design of a boat hull is important for static and dynamic buoyancy, dynamic tracking, and static floatation. The engine mounting system is important to secure the propulsion means to the boat hull structure in a manner and position such that optimum efficiency is achieved.

2. Background of the Invention

The design of a boat's hull structure has significant effect on the boat's utility, performance and appearance. To propel the boat forward or sternward a propulsion means, such as an engine, must be securely attached to the boat's hull structure. The location, weight and thrust of the engine significantly affect the design and operation of a high-speed planing power boat. Some hull structures are designed to use inboard/outboard engines, other designs use outboard engines.

When an inboard/outboard engine is used, a large amount of water is displaced. To maintain stability and an even keel, the inboard/outboard engine must be positioned near the hull structure's center of buoyancy. A large portion of the interior working and riding compartment is therefore occupied by the inboard/outboard engine and engine housing unit.

When an outboard engine is used, the hull structure must have a secure transom positioned fairly close to the water-line. The outboard engine is attached to the transom. The effectiveness of the outboard engine is dependent upon the propeller's position within the water. An engine well must also be provided to accommodate the engine housing and to help prevent swamping of the working area when the engine is run in reverse. A large portion of the interior working or riding compartment is occupied by the engine well. There is also a greater likelihood the interior compartment will be swamped because the transom is so low.

The hull structure's design effects the boat's stability and performance. The shape, length, breadth, depth, and displacement of the hull structure determine the boat's draft, freeboard, and planning characteristics. A variety of designs have been invented. The most popular recreational high-speed planning power boat design is the "V"-shaped hull structure. Some "V"-shaped hull structures utilize either indented or reflex chines. Lantz (U.S. Pat. No. 4,528,931), Charlins (U.S. Pat. No. 4,453,489), Wood et al. (U.S. Pat. No. 4,398,483), Wood et al. (U.S. Pat. No. 4,233,920), Schoell (U.S. Pat. No. 4,193,370), Wood Jr. (U.S. Pat. No. 4,128,072), Nescher (U.S. Pat. No. Des. 244,769), Livingston (U.S. Pat. No. Des. 236,333), Livingston (U.S. Pat. No. Des. 235,530), Baker (U.S. Pat. No. Des. 227,708), Simpkins (U.S. Pat. No. Des. 221,808), Yost (U.S. Pat. No. Des. 3,568,617), Dougherty (U.S. Pat. No. Des. 214,765), Ross (U.S. Pat. No. 3,303,809), Stamas (U.S. Pat. No. Des. 205,604), Schoell (U.S. Pat. No. 3,117,544), Rowland (U.S. Pat. No. Des. 196,211), and Cale (U.S. Pat. No. 3,091,206), Tritt (U.S. Pat. No. Des. 190,400) and Carr (U.S. Pat. No. 2,044,771) are examples of various design disclosures which utilize a "V"-shaped hull structure in combination with chines.

Other hull structure designs use a tunnel-shaped hull. Moyer (U.S. Pat. No. 4,192,248), Austin (U.S. Pat. No. 3,937,164), Payne (U.S. Pat. No. 3,709,179), Leger (U.S. Pat. No. Des. 193,041) and Canazzi (U.S. Pat. No. Des. 191,807) all incorporate a tunnel-shaped hull design with the use of chines.

Reflex chines can greatly improve the efficiency of a hull structure. Given the same general characteristics and power-input, boats with pronounced chines could have a lesser wetted hull surface area than do boats without chines. By achieving a reduced wetted hull structure, the boat will travel faster for a given rate of fuel consumption than will a similar boat not having that special feature. Reflex chines also provide the boat with a means for better tracking during operation because water is channeled along the bottom of the hull parallel to the keel. The location, number, and angle of the chines have given rise to the many different patents. Similarly, boats with shallower drafts climb more easily onto a plane than do boats with a greater draft. A single method or concept for using a specific hull structure or chine design has not been generally accepted in the sporting boat industry. This illustrates the unobvious nature of using differently designed hull structures in combination with differently designed chines.

Boats utilizing a "V"—or tunnel-shaped hull structure design still experience considerable negative effects, and the placement of chines onto the hull structure only partly overcomes the inadequacies. These boats still tend to "slide out" on turns and the wetted hull surface is only minimally reduced. In addition, problems such as the engine taking up space in the working compartment, the positioning of the outboard motor, the use of a low transom, and the swamping of the working compartment still plaque the sporting boat industry. This invention, to a very large extent, overcomes these problems.

Another very important factor in the design of boats is the appearance of the boat hull structure. Similar to the automotive industry, appearance is a major marketing factor. A sleek appearance on a power sport boat increases its marketability. Sleekness is perceived by the public to indicate a positive performance and ability to achieve high speeds. On most boats, the multiple use of chines breaks the contour of the boat hull. This reduces the boat's sleekness and streamlined appearance. Even though the hull is submerged during operation, the hull is readily in view when the boat is on a trailer or in dry dock.

To the applicant's knowledge, only three prior art disclosures address the issues of swamping and removing the need for an interior engine well. Sigler (U.S. Pat. No. 2,764,119), Yost (U.S. Pat. No. 2,842,086), and Finze (U.S. Pat. No. 4,306,703) disclose different gill bracket apparatus designed to support the outboard engine astern of the transom.

Although the use of a chine is not new, no known prior art illustrates a double deadrise hull structure in conjunction with the specific angular and locational characteristics of the reflex chines of this invention. This hull structure is unique and unobvious. The present invention also has an extremely sleek and streamlined appearance, increasing its marketability over the prior art. Nor does any prior art teach that the bottom of the engine mounting device should conform to the same contour of the attached hull structure including the use of chines. The applicant's engine mounting device is novel and unobvious.

OBJECTIVES OF THE INVENTION

It is the general objective of the present invention to provide a high-speed planing power boat hull structure which has low frictional drag characteristics, has adequate static and dynamic buoyancy, quickly and easily climbs to a plane when propelled forward on water, has a relatively small static and operational draft, has a sufficient static and operational freeboard, does not unduly pitch sternward when the propeller thrusts and accelerates the boat forward, and has dynamic tracking such that the structure does not "slide out" on a turn.

Another objective of the present invention is to design said hull structure with sufficient stability to prevent static or operational rolling, to achieve high speeds and a high degree of performance when operated, and to statically float in the unlikely event the structure were to break apart.

In the second embodiment, it is the further objective of the present invention to provide an engine mounting system which positions an outboard engine astern, provides a second and lower transom and engine mount, provides a lower and exterior engine well, acts as an added flotation chamber to support the weight of the engine, shifts the center of buoyancy sternward thus reducing the torque arm caused by the thrust of the propeller, removes the need for an interior engine well, enables the use of a high first transom, and provides a swimming platform with nonskid steps.

In the third embodiment, it is the further embodiment of the present invention to provide an engine mounting system which positions an inboard/outboard engine further sternward, acts as an added flotation chamber to support the weight of the engine, shifts the center of buoyancy sternward thus reducing the torque arm caused by the thrust of the propeller, reduces the amount of interior working space occupied by the inboard/outboard engine and engine housing unit, and provides a swimming platform with nonskid steps.

DISCLOSURE OF INVENTION

The present invention overcomes the previously mentioned disadvantages of the prior art while achieving the described general and specific objectives. The specific features of this invention, the double deadrise with reflex chine hull structure and the engine mounting system, are particularly suited for high-speed planing power boat hull structures of relatively small draft. This invention incorporates a combination of apparatus to produce a hull structure with low frictional drag characteristics, and reduced wetted hull area when the hull structure is propelled through water. The features of this invention imparts great stability and performance to the hull structure, giving the hull structure a sleek streamlined appearance, and providing low draft, sufficient freeboard, and static and operational buoyancy. This invention also provides the boat with a highly efficient means for dynamic tracking, for preventing "slide-out", and for quickly and easily achieving a plane.

The invention comprises a new hull design which incorporates a double deadrise hull structure with multiple reflex chines. The hull structure comprises five main areas: the keel, the stem, the bow hull, the aft hull and the transom. The keel and the stem lie within a vertical plane upon which all the elements of the hull structure are symmetrically disposed. The bow hull is a pair of longitudinal curvilinear planing surfaces which intersect the stem at an obtuse angle which imparts a "V"-shape to the bow hull when viewed from a transverse position perpendicular to the keel. The bow hull and stem have a fairly sharp static angle of entry. The aft hull is a pair of longitudinal curvilinear planing surfaces comprising a first and second pair of bottom surfaces, reflex chines, and side panels. The aft hull merges with the bow hull in a smooth curvilinear manner. The transom is a planar surface connecting the sternmost edges of the aft hull. The transom has a slight aft-perpendicular.

The planes of the first pair of bottom surfaces intersect at the keel. The intersection of the projected planes of the second pair of bottom surfaces is slightly below the keel at the transom and progressively approaches the keel as said planes approach the bow hull. The first angle of deadrise of the first pair of bottom surfaces is smaller than the second angle of deadrise of the second pair of bottom surfaces. The first and second pair of reflex chines angle downward and outward from the respective outer ends of the first and second pair of bottoms. The first pair of side panels angle upward and slightly outward from the outer ends of the first pair of reflex chines. The second pair of bottom surfaces angle upward and outward from the outer ends of the first pair of side panels. The width portion of each side of the first pair of bottom surfaces is approximately twice the width portion of each side of the second pair of bottom surfaces. The second pair of side panels angle upward and outward from the outer ends of the second pair of reflex chines. The first pair of reflex chines and side panels gradually decreases in width and depth as they merge into the bow hull slightly forward of the fore end of the keel. The second pair of reflex chines and side panels gradually decrease in width and depth as they merge together at the bow hull and stem.

The resistant forces of the water reservoir provide the upward lift forces enabling the hull structure to plane. When the hull structure is propelled forward the reflex chines and double deadrise bottom surfaces act together to harness the resistant forces and force the hull structure to plane on the surface of the water reservoir. The result of the lifting action is the redution of the wetted hull surface, thereby enabling the hull structure to achieve higher speeds without an increase in the rate of fuel consumption or necessity for increased power output.

Once the hull structure has begun to plane on the water surface and is being propelled forward, effectively only the first pair of bottom surfaces and the first pair of reflex chines contact the water reservoir surface. The hull structure rides upon the water contained between the first pair of reflex chines, beneath the first pair of bottom surfaces. The second pair of bottom surfaces and second pair of reflex chines only contain the spray occasioned by the first pair of bottom surfaces and reflex chines. The second pair of side panels are completely above the operational water line.

Due to the design of the double deadrise bottom surfaces and the multiple reflex chines, the hull structure has greater stability than a conventional "V"-shaped hull and acts very similar to a boat with a tunnel-shaped hull. The stern, however, does not "slide out" on turns. The aft and bow hulls dig into the water reservoir as the hull structure rounds a corner rather than sliding over the resisting water. This digging effect is due to the changed thrust direction of the propeller and the angling of the aft and bow hull planing surfaces. In particular, the reflex chines, bottom surfaces and side panels dig into the water reservoir rather than skimming or sliding along the water reservoir's surface. The angling and positioning of the reflex chines, bottom surfaces and side panels increase the static and operational stability of the hull structure. These features also give the hull structure an efficient means for tracking because water is channeled below the hull structure from fore and aft. The reflex chines, side panels and bottom surfaces all act as fixed rudders restricting sideward movement.

The engine mounting device of this invention gives the boat a means whereby the engine may be attached thereto, permits the hull structure to maintain a high transom and reduces the sacrificed space within the working compartment. The engine mounting device permits the proper positioning of the propeller within the water reservoir thereby obtaining optimum performance of the engine. The engine mounting device also assists the hull structure to maintain an even keel, better trim, and to quickly and easily climb onto a plane without a pronounced sternward pitch. The engine mounting device adds approximately two feet of planing surface to the stern of the boat. This provides the hull structure with added lift when climbing to a plane. The engine mounting device also provides a means for static flotation in the unlikely event the boat were to break apart. In addition, the engine mounting device incorporates all of the benefits achieved with the new hull structure design. The engine mounting device may be attached to a boat having the hull structure of this invention such that the bottom portions of the device conform to the same bottom and chine contours of the boat hull structure. The engine mounting device may also be attached to the transom of any standard hull structure. If this is done, the lowest portions of the device meet the bottom of the standard hull structure. The device may also be redesigned to generally conform to the same bottom and chine contour of any given boat hull structure.

In the second, third, and fourth embodiments, the configuration of the hull structure extends past the transom and continues along the bottom of the engine mounting device to terminate at a second transom attached to the stern of said mounting device. The engine mounting device is attached to the boat transom to give the boat added buoyancy and to support the engine. This enables the hull structure to retain a high transom and thereby prevent swamping of the working compartment when the boat is operated in reverse. An additional and important benefit is the area in the working compartment, that would otherwise be occupied by the engine housing or engine well, is freed for use by the occupants. Because of the increased stern buoyancy, the boat has greater stability both statically and operationally. The engine mounting system prevents the hull structure from unduly pitching sternward when the boat accelerates because the bow is held down when the boat goes on and off a plane. This occurs because the center of buoyancy is further sternward. The torque arm, resulting from the thrust of the propeller, is shorter and has less lifting effect on the bow. The hull structure generally experiences an even keel.

The second embodiment incorporates the hull structure and engine mounting device as disclosed herein in conjunction with the use of an outboard engine. The third embodiment incorporates the above mentioned hull structure and engine mounting device with the use of an inboard/outboard engine. The fourth embodiment incorporates the above mentioned hull structure and engine mounting device with the use of a inboard/outboard jet engine. Inboard/outboard jet engines are often called inboard turbine egines. When an inboard/outboard jet engine is used, this invention allows the hull structure to plane on a very shallow water reservoir, even only inches of water, without contacting the bottom of the reservoir. This is due to the very low operational draft of the hull structure and the absence of an extended propeller.

BEST MODE OF CARRYING OUT THE INVENTION

Figure 1:
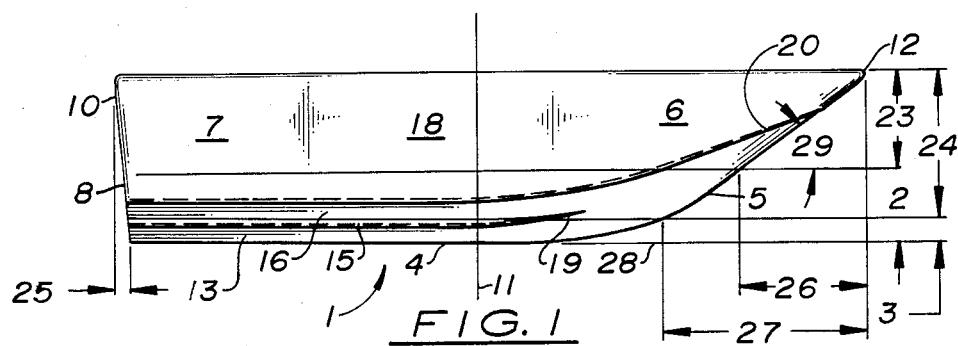
FIG. 1 is a starboard side view illustrating the boat hull structure made in accordance with this invention.
Figure 2:
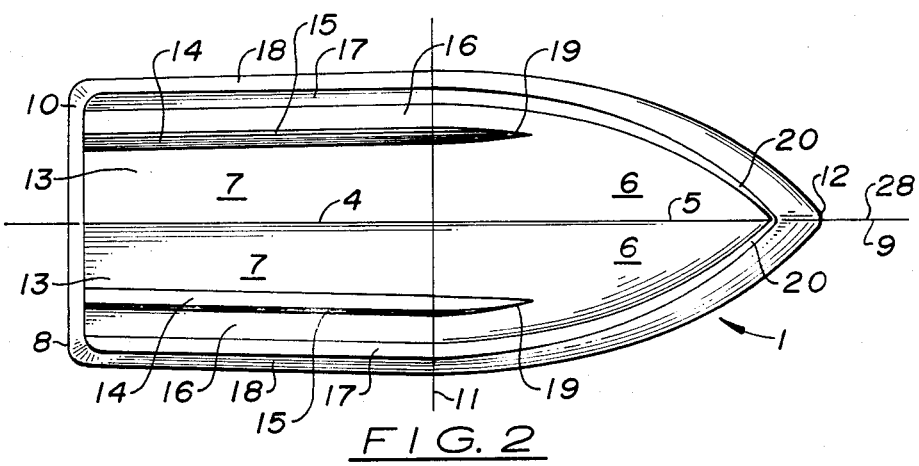
FIG. 2 is a bottom view of the apparatus shown in FIG. 1.
Figure 3:
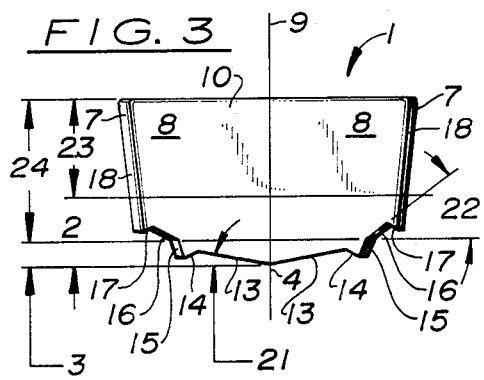
FIG. 3 is a back view of the apparatus shown in FIG. 1.
Figure 4:
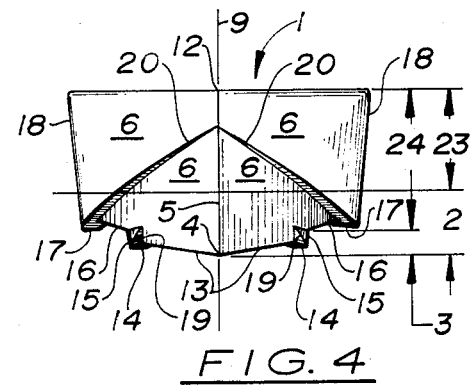
FIG. 4 is a front view of the apparatus shown in FIG. 1.
Figure 5:
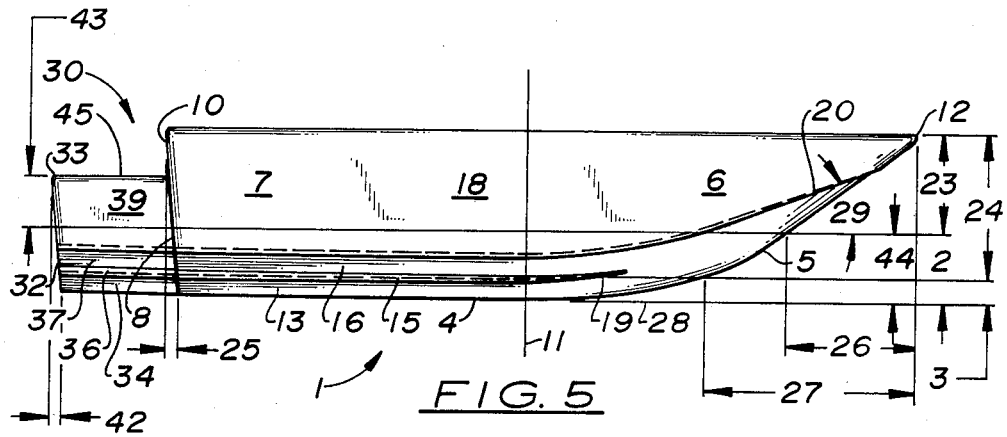
FIG. 5 is a starboard side view of the second embodiment illustrating the combined boat hull structure and engine mounting system made in accordance with this invention.
Figure 6:
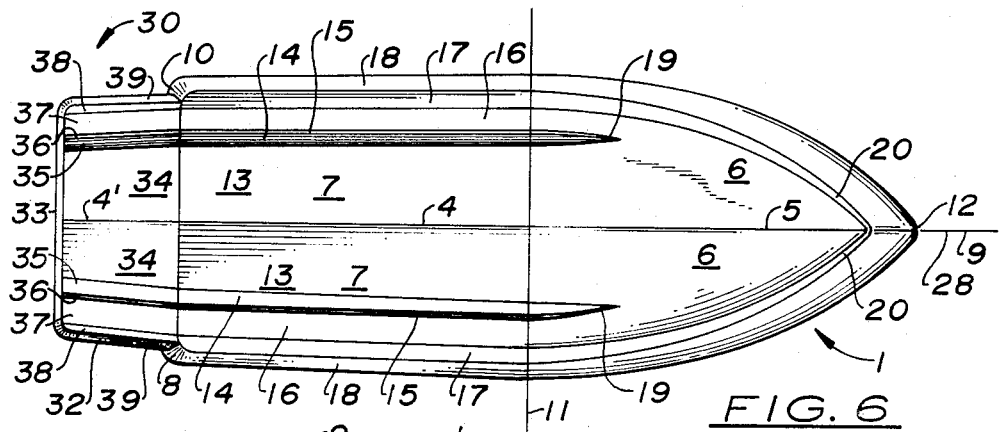
FIG. 6 is a bottom view of the apparatus shown in FIG. 5.
Figure 7:
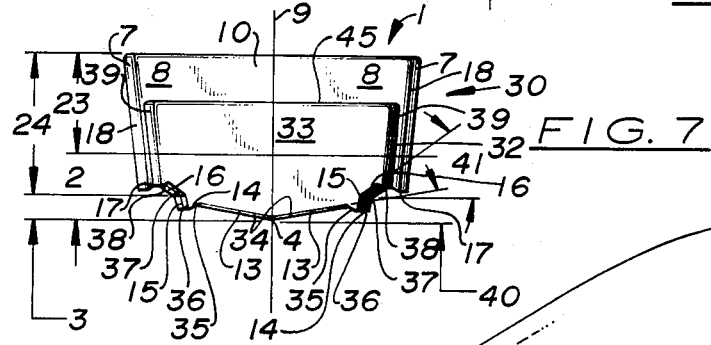
FIG. 7 is a back view of the apparatus shown in FIG. 5.
Figure 8:
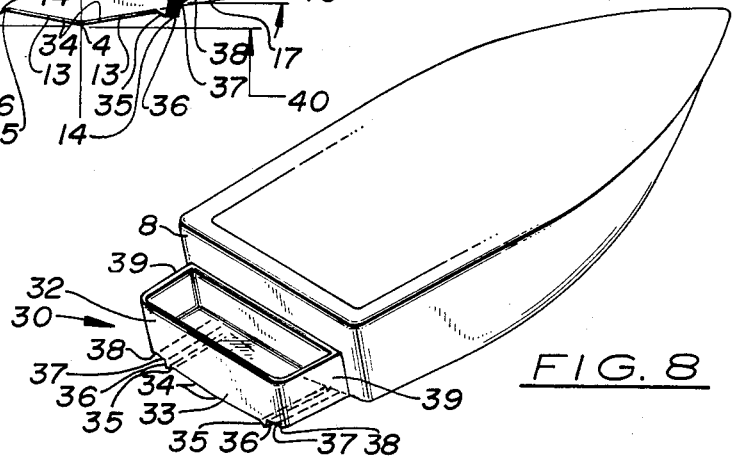
FIG. 8 is an isometric view of the engine mounting device attached to a standard boat hull structure.

Referring to the drawings, wherein like numerals indicate like parts, FIGS. 1-8 illustrate the boat hull structure 1 constructed in accordance with the present invention. The invention is a high-speed planing power boat hull structure 1 which has a relatively small static draft 2 and very small operational draft 3. The hull structure 1 was designed to utilize low frictional drag features to enable it to achieve high speeds and yet maintain optimal stability and performance.

The hull structure 1 comprises five main areas: the keel 4, the stem 5, the bow hull 6, the aft hull 7 and the transom 8. The keel 4 is horizontally positioned within a vertical plane 9 extending from the stern 10 to ahead of amidship 11. The keel 4 defines the longitudinal axis 28. The stem 5, extends from the fore end of the keel 4, curves forward and upward within the vertical plane 9, and ends at the head 12. The aft hull 7 comprises a pair of longitudinally extending curvilinear planing surfaces symmetrically disposed about the vertical plane 9 and the keel 4, one planing surface positioned to the port and the other planing surface positioned to the starboard. The bow hull 6 comprises a pair of longitudinal curvilinear planing surfaces, one planing surface to the port and the other planing surface to the starboard, symmetrically disposed about the vertical plane 9 and the stem 5. The pair of surfaces forming the bow hull 6 intersect the keel 4, stem 5, and head 12 at an obtuse angle such that the bow hull 6 has a "V"-shape when viewed from a vertical transverse plane perpendicular to the longitudinal axis 28. The aft hull 7 merges with the bow hull 6 in a streamlined continuous manner. The transom 8 is positioned at the stern 10 of the hull structure 1, intersects the sternward most end of the aft hull 7, and extends downwardly and forwardly to intersect the stern 10 end of the keel 4. The bow hull 6, the aft hull 7 and the transom 8 have a shallow static draft 2, a shallow operational draft 3, a sufficient static freeboard 23 and a sufficient operational freeboard 24. The aft hull 7 has an aft-perpendicualr 25. The bow hull 6 has a static ford-perpendicular 26 and an operational ford-perpendicular 27. The bow hull 6 also has a sharp static entry angle 29.

The aft hull 7 has six subpart surfaces: a first pair of bottom surfaces 13, a first pair of reflex chines 14, a first pair of side panels 15, a second pair of bottom surfaces 16, a second pair of reflex chines 17 and a second pair of side panels 18. The first pair of bottom surfaces 13, reflex chines 14, and side panels 15 are symmetrically disposed about the vertical plane 9, extend fore and aft intermediate the bow hull 6 and the stern 10, and merge into the bow hull 6 at a first streamlined continuous transitional area 19. The second pair of bottom surfaces 16, reflex chines 17 and side panels 18, extend fore and aft intermediate the stem 5 and the stern 10, and merge into the bow hull 6 and the stem 5 at a second streamlined continuous transitional area 20. The first pair of reflex chines 14 and the second pair of reflex chines 17 gradually decrease in width and depth upon merging into the bow hull 6. The aft hull 7 and each of its six subparts are designed with a slight tumblehome-stern. A tumblehome-stern is where the aft hull 7 narrows slightly as the aft hull 7 approaches the stern 10.

The planes of the first pair of bottom surfaces 13 intersect at the keel 4. The intersection of the projected planes of the second pair of bottom surfaces 16 is slightly below the keel 4 at the transom 8 and progressively approaches the keel 4 as the second pair of bottom surfaces 16 approach the bow hull 6. The first angle of deadrise 21 of the first pair of bottom surfaces 13 is less than the second angle of deadrise 22 of the second pair of bottom surfaces 16. In the preferred embodiment as viewed from a transverse section perpendicular to the stern 10 end of the keel 4, the second angle of deadrise 22 is approximately 5 to 15 degrees greater than the first angle of deadrise 21.

The first pair of reflex chines 14 connect the corresponding port and starboard sides of the first pair of bottom surfaces 13 to the first pair of side panels 15. The first pair of reflex chines 14 angle downward and outward from the outermost edge of the first pair of bottom surfaces 13. The first pair of side panels 15 angle upward and outward away from the outer edges of the first pair of reflex chines 14. The second pair of bottom surfaces 16 angle upward and outward away from the outer edges of the first pair of side panels 15.

The second pair of reflex chines 17 connect the corresponding port and starboard sides of the second pair of bottom surfaces 16 to the second pair of side panels 18. The second pair of reflex chines 17 angle downward and outward from the outermost edge of the second pair of bottom surfaces 16. The second pair of side panels 17 angle upward and outward from the outermost edges of the second pair of reflex chines 17.

Once the propelled hull structure 1 exceeds the speed of laminar flow, the resistant forces of the water being displaced by the hull structure 1 exert an upward lift force on the aft hull 7 and the bow hull 6. The result of the lifting action is the reduction of the wetted hull surface. Since less water is displaced and the wetted hull surface is reduced, the frictional surface area decreases and the hull structure 1 is able to travel faster without an increase in fuel consumption or power output. The first and second pair of reflex chines 14, 17 assist in reducing the wetted hull surface while the hull structure 1 climbs to a plane.

Once a plane is achieved, the first pair of bottom surfaces 13 act with the first pair of reflex chines 14 to direct the resistant forces solely against the first pair of bottom surfaces 13 and reflex chines 14. Because the first angle of deadrise 21 is less than the second angle of deadrise 22, the displaced water, which is not contained between the first pair of reflex chines 14, is directed away from the hull structure 1 so that only the spray will contact the second pair of bottom surfaces 16. This maintains the reduced wetted hull surface. The second pair of reflex chines 17 prevent the overspray from riding up the second pair of side panels 18 and spraying the interior working compartment. This invention also gives the hull structure 1 an efficient means for tracking. Similar to the concept of a tunnel-shaped hull design, the displaced water in the present invention is channeled below the first pair of bottom surfaces 13 from stem 5 to stern 10 between the first pair of reflex chines 14.

The angling of the first and second pair of reflex chines 14, 17 and the angling of the first and second pair of side panels 15, 18 assist the hull structure 1 to maintain stability when rounding a curve during operation. A common problem with current boat hull structures is that their aft portions "slide-out" or drift sideways when they are making a curve at high speeds. This problem is greatly reduced with the present invention. The aft and bow hulls 7, 6 dig into the water reservoir when the hull structure rounds a curve. The digging effect is due to the changed thrust direction of the propeller and the angling of the aft and bow hull 7, 6 planing surfaces. When rounding a curve, the first and second pair of reflex chines 14, 17 and bottom surfaces 13, 16, and the first pair of side panels 15 not only channel the water beneath the hull structure but they also act as rudders to restrict sideward sway. Due to this inventive design the hull structure 1 has phenomenally better stability and performance than was previously known in the art of sport-boat design.

FIGS. 5–8 illustrate the boat hull structure 1 as depicted in FIGS. 1–4 in combination with the engine mounting device 30. The engine mounting device 30 is used in the second, third and fourth embodiments. The first embodiment does not utilize the engine mounting device 30. The second embodiment utilizes the engine mounting device 30 in conjunction with an outboard engine. The third embodiment utilizes the engine mounting device 30 with an inboard/outboard engine. The fourth embodiment utilizes the engine mounting device 30 with an inboard/outboard jet engine. The differences between the second, third and fourth embodiments are minor. In the third and fourth embodiments, the engine well 31 is not used and the engine mount hull 32 is adapted to permit the proper positioning of the inboard/outboard propeller or jet into the water reservoir.

The engine mounting device 30 has two main parts: an engine mount hull 32 and a second transom 33. Similar to the aft hull 7, the engine mount hull 32 has six subpart surfaces: a third pair of bottom surfaces 34 meeting at keelplate 4', a third pair of reflex chines 35, a third pair of side panels 36, a fourth pair of bottom surfaces 37, a fourth pair of reflex chines 38, and a fourth pair of side panels 39. The third and fourth pair of bottom surfaces 34, 37, reflex chines 35, 38, and side panels 36, 39 are symmetrically disposed about the vertical plane 9, intersect at a second keel, extend fore and aft intermediate the transom 8 and the second transom 33, and merge into and extend from the transom 8. The third pair of bottom surfaces 34, in essence, are a continuation of the first pair of bottom surfaces 13 from the aft hull 7 to the second transom 33. The same correlation exists between the third and first pair of reflex chines 35, 14, the third and first pair of side panels 36, 15, the fourth and second pair of bottom surfaces 37, 16, and the fourth and second pair of reflex chines 38, 17. The mergence of these third and first, and fourth and second elements is in a streamlined and continuous manner. The third pair of bottom surfaces 34 have a third angle of deadrise 40. The fourth pair of bottom surfaces have a fourth angle of deadrise 41. The fourth pair of reflex chines 38 are smaller in width and depth than are the second pair of reflex chines 17. The fourth pair of side panels 39 extend upwardly, and optionally outwardly, from the outer edges of the fourth pair of reflex chines 38. The second transom 33 is the sternward most element of the engine mounting device 30 and is integrally connected to the aft edges of the engine mount hull 32. The engine mount hull 32 has a second aft-perpendicular 42, a shallow static and operational draft 2, 3, and a sufficient second static and operational freeboard 43, 44. The engine mount hull 32 also angles sternward and slightly upward from the transom 8 to the second transom 33 and has a slight tumblehome-stern.

The second transom 33 is of sufficient strength to support either an outboard engine or an inboard/outboard engine. The second transom 33 has a lower second static and operational freeboard 43, 44 than does the transom 8. The height of the second transom 33 permits the proper positioning of a propeller, attached to an outboard engine, within the water reservoir. Alternatively, the engine mount hull 32 may be adapted to accommodate an inboard/outboard engine or an inboard/outboard jet engine. The upper housing 45 of the engine mounting device 30 accommodates an engine well 31, if an outboard engine is used, and a pair of diving platforms.

The hull structure 1 is preferably made of relatively light materials, the outer surface thereof having low frictional drag characteristics. Fiberglass with an outer gel coat is used in the preferred embodiment. The engine mounting device 30 may be made of wood and fiberglass and may be partially filled with a means for flotation, such as the expanded rigid polystyrene plastic material sold under the trademark Styrofoam, to make an inherently strong and rigid outboard engine mount or inboard/outboard engine support.

INDUSTRIAL APPLICABILITY

The industrial applicability of this invention can be readily ascertained by reference to the following example of its use.

As the hull structure sits statically in a water reservoir the angling of the first and second pair of bottom surfaces, reflex chines and side panels, in addition to the bow hull, all act to contain the water immediately beneath the hull structure. Because the water is restrained from escaping laterally, the hull structure is prevented from rolling and swaying. The longitudinal length of the hull structure prevents the boat from yawing and pitching. In a static position, the hull structure is extremely stable and acts similar to a tunnel-shaped hull structure. The engine mounting device as shown in the second third and fourth embodiments acts as an added buoyancy chamber to support the engine and enable the boat to maintain an even keel. The hull structure has a low static draft and a sufficient static freeboard.

As the hull structure is propelled forward the engine mounting device of the second third and fourth embodiments prevents sternward pitching by supporting the aft hull and holding the bow hull down. Consequently, the thrust of the propeller directs the hull structure forward rather than downward or upward. Once the hull structure exceeds the speed of laminar flow, the resistant forces of the water being displaced by the hull structure exert an upward lift force on the aft and bow hulls. The double deadrise bottom surfaces act together with the multiple reflex chines to direct these resistant forces to a smaller bottom planing surface area. The result of the lifting action is the reduction of the wetted hull surface. Because less water is displaced and the wetted surface is reduced, the frictional surface area decreases and the hull structure is able to travel faster without an increase in fuel consumption or power output. When the engine mounting device of the second, third and fourth embodiment is used, the hull structure is able to quickly and easily climb to plane along the water surface.

When the hull structure is planing and is propelled strictly forward, the resisting water is contained between the first pair of reflex chines beneath the first pair of bottom surfaces. Of the aft hull subparts and engine mounting device, only the first and third pair of bottom surfaces and reflex chines ride upon the water's surface. The second and fourth pair of bottom surfaces and reflex chines contain the spray occasioned by the hull structure's propulsion. The second and fourth pair of side panels are generally completely above the operational water line. Because the first angle of deadrise is less than the second angle of deadrise, the displaced water is directed away from the hull without unduly contacting the second pair of bottom surfaces. Only the spray contacts the second pair of bottom surfaces. The use of a thus angled double deadrise hull structure in conjunction with multiple reflex chines significantly reduces the wetted hull surface area and allows the hull structure to travel much faster with a less powerful and weightier engine than was previously possible. These features also give the hull structure an efficient means for tracking because water is channeled below the hull structure from fore and aft similar to the effect experienced by a tunnel-shaped hull structure.

Even though this invention incorporates many of the beneficial features of a tunnel-shaped hull design, this invention does not skim along the water surface as it is making a turn. Rather, when rounding a curve the aft and bow hulls dig into the water reservoir and do not "slide-out". The reflex chines, side panels and bottom surfaces all act as fixed rudders restricting sideward movement. This digging effect is due to the changed thrust direction of the propeller and the angling of the aft and bow hull planing surfaces. Both pairs of reflex chines and bottom planing surfaces, in addition to the first pair of side panels, contact and dig into the water reservoir as the hull structure makes the turn. The combination of these features not only dramatically increases the hull structure's static and dynamic stability and power performance but also gives the hull structure a sleek and streamlined appearance.

I claim:

1. A boat hull structure comprising:
   (a) a first pair of bottom surfaces having a first angle of deadrise;
   (b) a first pair of reflex chines, each chine of said first pair of reflex chines extending outwardly and downwardly from outer edges of said first pair of bottom surfaces;
   (c) a first pair of side panels, each panel of said first pair of side panels extending upwardly from outer edges of said first pair of reflex chines;
   (d) a second pair of bottom surfaces extending outwardly from upper edges of said first pair of side panels and having a second angle of deadrise, said second angle of deadrise being different from said first angle of deadrise;
   (e) a second pair of reflex chines, each chine of said second pair of reflex chines extending outwardly and downwardly from outer edges of said second pair of bottom surfaces;
   (f) a second pair of side panels, each panel of said second pair of side panels extending upwardly from outer edges of said second pair of reflex chines; and
   (g) a transom interconnecting said first pair of bottom surfaces, said first pair of reflex chines, said first pair of side panels, said second pair of bottom surfaces, said second pair of reflex chines, and said second pair of side panels.

2. The boat hull structure in accordance with claim 1 wherein said second angle of deadrise is greater than said first angle of deadrise.

3. A high-speed planing power boat hull structure of relatively small draft and low frictional drag characteristics enabling said boat to achieve high speeds and stable performance comprising:
   (a) a keel positioned within a vertical plane, said keel extending from a stern to ahead of amidship, said keel defining a longitudinal axis of said hull structure;
   (b) a stem integrally extending from a fore end of said keel curving forward and upward within said vertical plane and terminating at a head;
   (c) a streamlined bow hull area symmetrically disposed about said vertical plane, said bow hull area interconnecting said stem and said head, and having a generally "V"-shape in cross section perpendicular to said longitudinal axis, said bow hull area having a port and a starboard side;
   (d) a streamlined aft hull area symmetrically disposed about said vertical plane and interconnecting said keel and bow hull area, said aft hull area merging with said bow hull area at a first and a second streamlined continuous transitional surface, said aft hull area having a port and a starboard side;
   (e) a transom located at said stern, said transom being symmetrically disposed about said vertical plane, said transom interconnecting aft portions of said aft hull area and said keel, said transom having a port and a starboard side;
   (f) wherein said aft hull area has a first pair of streamlined longitudinally extending planing bottom surfaces symmetrically disposed about said vertical plane, said first pair of bottom surfaces extending fore and aft intermediate said bow hull area and said stern and having a first angle of deadrise, said first pair of bottom surfaces interconnecting said keel, said bow hull area, and said transom, said first pair of bottom surfaces merging with said bow hull area at said first streamlined continuous translational surface;
   (g) wherein said aft hull area has a first pair of streamlined longitudinally extending reflex chines symmetrically disposed about said vertical plane, said first pair of reflex chines extending fore and aft intermediate said bow hull area and said stern, said first pair of reflex chines interconnecting outer edges of said first pair of bottom surfaces, said bow hull area and said transom, said first pair of reflex chines angling downwardly and outwardly away from said outer edges of said first pair of bottom surfaces, said first pair of reflex chines merging with said bow hull area at said first streamlined continuous translational surface and gradually decreasing in width and depth upon merging into said bow hull area;
   (h) wherein said aft hull area has a first pair of streamlined longitudinally extending side panels symmetrically disposed about said vertical plane, said first pair of side panels extending fore and aft intermediate said bow hull area and said stern, said first pair of side panels interconnecting said first pair of reflex chines, bow hull area and transom, said first pair of side panels angling upwardly and outwardly away from outer edges of said first pair of reflex chines, said first pair of side panels merging with said bow hull area at said first streamlined continuous trasitional surface and gradually decreasing in depth upon merging into said bow hull area;
   (i) wherein said aft hull area has a second pair of streamlined longitudinally extending planing bottom surfaces symmetrically disposed about said vertical plane, said second pair of bottom surfaces extending fore and aft intermediate said bow hull area and said stern and having a second angle of deadrise, said second pair of bottom surfaces interengaging said first pair of side panels, said bow hull area and said transom, said second pair of bottom surfaces merging with said bow hull area at said second streamlined continuous translational surface, said second angle of deadrise being greater than said first angle of deadrise;
   (j) wherein said aft hull area and said bow hull area have a second pair of streamlined longitudinally extending reflex chines symmetrically disposed about said vertical plane, said second pair of reflex chines extending fore and aft intermediate said stem and said stern, said second pair of reflex chines interconnecting outer edges of said second pair of bottom surfaces, said transom and said stem, said second pair of reflex chines angling downwardly and outwardly away from said outer edges of said second pair of bottom surfaces, said second pair of reflex chines gradually decreasing in width and depth to merge with said stem; and
   (k) wherein said aft hull area and said bow hull area have a second pair of streamlined longitudinally extending side panels symmetrically disposed about said vertical plane, said second pair of side panels extending fore and aft intermediate said stem and said stern, said second pair of side panels interconnecting said second pair of reflex chines, said stem, said head and said transom, said second pair of side panels merging at a streamlined curvature with said stem and said head.

4. The hull structure in accordance with claim 3 wherein said aft hull area, said first pair of bottom surfaces, said first pair of reflex chines, said first pair of side panels, said second pair of bottom surfaces, said second pair of reflex chines, and said second pair of side panels have a slight tumblehome-stern end.

5. The hull structure in accordance with claim 3 having a generally obtuse "V"-shape in cross section at a vertical transverse plane perpendicular to said longitudinal axis.

6. The hull structure in accordance with claim 3 wherein said bow hull area, said aft hull area, and said transom have a shallow static and operational draft.

7. The hull structure in accordance with claim 3 wherein said first angle of deadrise increases as said aft hull area merges with said bow hull area.

8. The hull structure in accordance with claim 3 wherein said second angle of deadrise increases as said aft hull area merges with said bow hull area.

9. The hull structure in accordance with claim 3 wherein:
   (a) said aft hull area has an aft-perpendicular; and
   (b) said transom extends downwardly and forwardly along aft portions of said aft hull area to form said aft-perpendicular.

10. The hull structure in accordance with claim 3 wherein said second pair of side panels merge at an arcuate streamlined curvature with said stem and said head.

11. The hull structure in accordance with claim 3 further comprising:
   (l) a keelplate positioned within said vertical plane and extending rearwardly from the aft end of said keel;
   (m) a streamlined engine mount hull symmetrically disposed about said vertical plane, said engine mount hull having a port and a starboard side interengaged with said keelplate and extending outwardly therefrom;
   (n) a second transom symmetrically disposed about said vertical plane, said second transom interengaging aft portions of said engine mount hull and said keelplate;
   (o) wherein said engine mount hull has a third pair of streamlined longitudinally extending planing bottom surfaces symmetrically disposed about said vertical plane, said third pair of bottom surfaces interconnecting said keelplate, said aft hull area, said first pair of bottom surfaces, said transom and said second transom, said third pair of bottom surfaces extending fore and aft intermediate said transom and said second transom, said third pair of bottom surfaces having a third angle of deadrise, said third pair of bottom surfaces merging with said first pair of bottom surfaces in a streamlined continuous manner;
   (p) wherein said engine mount hull has a third pair of streamlined longitudinally extending reflex chines symmetrically disposed about said vertical plane, said third pair of reflex chines interconnecting said third pair of bottom surfaces, said aft hull area, said first pair of reflex chines, said transom and said second transom, said third pair of reflex chines extending fore and aft intermediate said transom and said second transom, said third pair of reflex chines angling downwardly and outwardly away from outer edges of said third pair of bottom surfaces, said third pair of reflex chines merging with said first pair of reflex chines in a streamlined continuous manner;
   (q) wherein said engine mount hull has a third pair of streamlined longitudinally extending side panels symmetrically disposed about said vertical plane, said third pair of side panels intersecting and being integrally attached to said third pair of reflex chines, said aft hull area, said first pair of side panels, said transom and said second transom, said third pair of side panels extending fore and aft intermediate said transom and said second transom, said third pair of side panels angling upwardly and outwardly away from outer edges of said third pair of reflex chines, said third pair of side panels merging with said first pair of side panels in a streamlined continuous manner;
   (r) wherein said engine mount hull has a fourth pair of streamlined longitudially extending curvilinear planing bottom surfaces symmetrically disposed about said vertical plane, said fourth pair of bottom surfaces interengaging said third pair of side panels, said aft hull area, said second pair of bottom surfaces, said transom and said second transom, said second pair of bottom surfaces extending fore and aft intermediate said transom and said second transom, said second pair of bottom surfaces having a fourth angle of deadrise, said fourth angle of deadrise being greater than said third angle of deadrise, said fourth pair of bottom surfaces merging with said second pair of bottom surfaces in a streamlined continuous manner;
   (s) wherein said engine mount hull has a fourth pair of streamlined longitudinally extending reflex chines symmetrically disposed about said vertical plane, said fourth pair of reflex chines intersecting and being integrally attached to said fourth pair of bottom surfaces, said aft hull area, said second pair of reflex chines, said transom and said second transom, said fourth pair of reflex chines extending fore and aft intermediate said transom and said second transom, said fourth pair of reflex chines angling downwardly and outwardly away from outer edges of said fourth pair of bottom surfaces, said fourth pair of reflex chines merging with said second pair of reflex chines in a streamlined continuous manner; and
   (t) wherein said engine mount hull has a fourth pair of streamlined longitudinally extending side panels symmetrically disposed about said vertical plane, said fourth pair of side panels intersecting and being integrally attached to said fourth pair of reflex chines, said aft hull area, said transom and said second transom, said fourth pair of side panels extending fore and aft intermediate said transom and said second transom, said fourth pair of side panels angling upwardly from outer edges of said fourth pair of reflex chines.

12. The hull in accordance with claim 11 wherein said engine mount hull, said third pair of bottom surfaces, said third pair of reflex chines, said third pair of side panels, said fourth pair of bottom surfaces, said fourth pair of reflex chines, and said fourth pair of side panels have a slight tumblehome-stern end.

13. The hull structure in accordance with claim 11 wherein said engine mount hull and said second transom have a shallow static and operational draft.

14. The hull structure in accordance with claim 11 wherein:
   (a) said engine mount hull has a second aft-perpendicular;

(b) said second transom extends downwardly and forwardly along the aft portions of said engine mount hull to form said second aft-perpendicular.

15. The hull structure in accordance with claim 11 wherein said second engine mount hull, said second keel, said third pair of bottom surfaces, said third pair of reflex chines, said third pair of side panels, said fourth pair of bottom surfaces, said fourth pair of reflex chines, and said fourth pair of side panels angle sternward and slightly upward from said transom to said second transom.

16. The hull structure in accordance with claim 11 wherein said fourth pair of side panels angle upwardly and outwardly away from said outer edges of said fourth pair of reflex chines.

17. The hull structure in accordance with claim 11 wherein said second transom is of sufficient strength to support an outboard engine, said second transom having sufficient freeboard to allow the correct positioning of a propeller, attached to said outboard engine, into a water reservoir.

18. The hull structure in accordance with claim 11 wherein said second transom is of sufficient strength to support an inboard/outboard engine, said engine mount hull permitting the correct positioning of a propeller, attached to said inboard/outboard engine, into a water reservoir.

19. The hull structure in accordance with claim 11 wherein said second transom is of sufficient strength to support an inboard/outboard jet engine, said engine mount hull permitting the correct positioning of a jet intake and a jet outlet opening in a water reservoir.

20. An engine mounting device, which attaches to a stern of a boat hull structure, comprising:
   (a) a keelplate positioned within a vertical plane, said keelplate extending from a fore end to an aft end, said keelplate defining a longitudinal axis of said engine mounting device;
   (b) a streamlined engine mount hull symmetrically disposed about said vertical plane, said engine mount hull interengaging said keelplate, said engine mount hull having a port and a starboard side;
   (c) a transom symmetrically disposed about said vertical plane, said transom interengaging aft portions of said engine mount hull and said aft end of said keelplate, said transom having a port and a starboard side;
   (d) wherein said engine mount hull has a pair of streamlined longitudially extending planing bottom surfaces symmetrically disposed about said vertical plane, said pair of bottom surfaces interengaging said keelplate and said transom, said pair of bottom surfaces extending fore and aft along said engine mounting device and having a first angle of deadrise;
   (e) wherein said engine mount hull has a pair of streamlined longitudinally extending reflex chines symmetrically disposed about said vertical plane, said pair of reflex chines interengaging said pair of bottom surfaces and said transom, said pair of reflex chines extending fore and aft along said engine mounting device, said pair of reflex chines angling downwardly and outwardly away from outer edges of said pair of bottom surfaces;
   (f) wherein said engine mount hull has a pair of streamlined longitudinally extending side panels symmetrically disposed about said vertical plane, said pair of side panels interengaging said pair of reflex chines and said transom, said pair of side panels extending fore and aft along said engine mounting device, said pair of side panels angling upwardly and outwardly from outer edges of said pair of reflex chines;
   (g) wherein said engine mount hull has another pair of streamlined longitudinally extending planing bottom surfaces symmetrically disposed about said vertical plane, said other pair of bottom surfaces interengaging said pair of side panels and said transom, said pair of bottom surfaces extending fore and aft along said engine mounting device, and having a second angle of deadrise, said second angle of deadrise being greater than said first angle of deadrise;
   (h) wherein said engine mount hull has another pair of streamlined longitudinally extending reflex chines symmetrically disposed about said vertical plane, said other pair of reflex chines intersecting and being integrally attached to said other pair of bottom surfaces and said transom, said other pair of reflex chines extending fore and aft along said engine mounting device, said other pair of reflex chines angling downwardly and outwardly away from outer edges of said other pair of bottom surfaces; and
   (i) wherein said engine mount hull has another pair of streamlined longitudinally extending curvilinear side panels symmetrically disposed about said vertical plane, said other pair of side panels intersecting and being integrally attached to said other pair of reflex chines and said transom, said other pair of side panels extending fore and aft along said engine mounting device, said other pair of side panels angling upwardly away from outer edges of said other pair of reflex chines.

21. The engine mounting device in accordance with claim 20 wherein said engine mount hull, said pair of bottom surfaces, said pair of reflex chines, said pair of side panels, said other pair of bottom surfaces, said other pair of reflex chines, and said other pair of side panels have a slight tumblehome-stern end.

22. The engine mounting device in accordance with claim 20 wherein said engine mount hull and said transom have a shallow static and operational draft.

23. The engine mounting device in accordance with claim 20 wherein said engine mount hull has an aft-perpendicular.

24. The engine mounting device in accordance with claim 23 wherein said transom extends downwardly and forwardly along aft portions of said engine mount hull to form said aft-perpendicular.

25. The engine mounting device in accordance with claim 20 wherein said engine mount hull, said keel, said pair of bottom surfaces, said pair of reflex chines, said pair of side panels, said other pair of bottom surfaces, said other pair of reflex chines, and said other pair of side panels angle sternward and slightly upward away from said fore end.

26. The engine mounting device in accordance with claim 20 wherein said other pair of side panels angle upwardly and outwardly away from said outer edges of said other pair of reflex chines.

* * * * *

UNITED STATES PATENT AND TRADEMARK OFFICE
CERTIFICATE OF CORRECTION

PATENT NO. : 4,813,365
DATED : March 21, 1989
INVENTOR(S) : Lindstrom et al.

It is certified that error appears in the above—identified patent and that said Letters Patent is hereby corrected as shown below:

In column 12, lines 1, 15, and 41, "translational" should be --transitional--.

In column 14, line 54, after "upwardly" insert --away--.

In column 14, line 56, after "hull" insert --structure--.

In column 15, line 49, "longitudially" should be --longitudinally--.

Signed and Sealed this

Thirty-first Day of October, 1989

Attest:

DONALD J. QUIGG

*Attesting Officer*  *Commissioner of Patents and Trademarks*